No. 623,456. Patented Apr. 18, 1899.
S. R. BAILEY.
CARRIAGE AXLE BEARING.
(Application filed Dec. 14, 1898.)
(No Model.) 2 Sheets—Sheet 1.

Witnesses
Karl A. Andrén.
Francis A. Perry.

Inventor
Samuel R. Bailey.
by Alban Andrén
his atty.

No. 623,456. Patented Apr. 18, 1899.
S. R. BAILEY.
CARRIAGE AXLE BEARING.
(Application filed Dec. 14, 1898.)
(No Model.) 2 Sheets—Sheet 2.
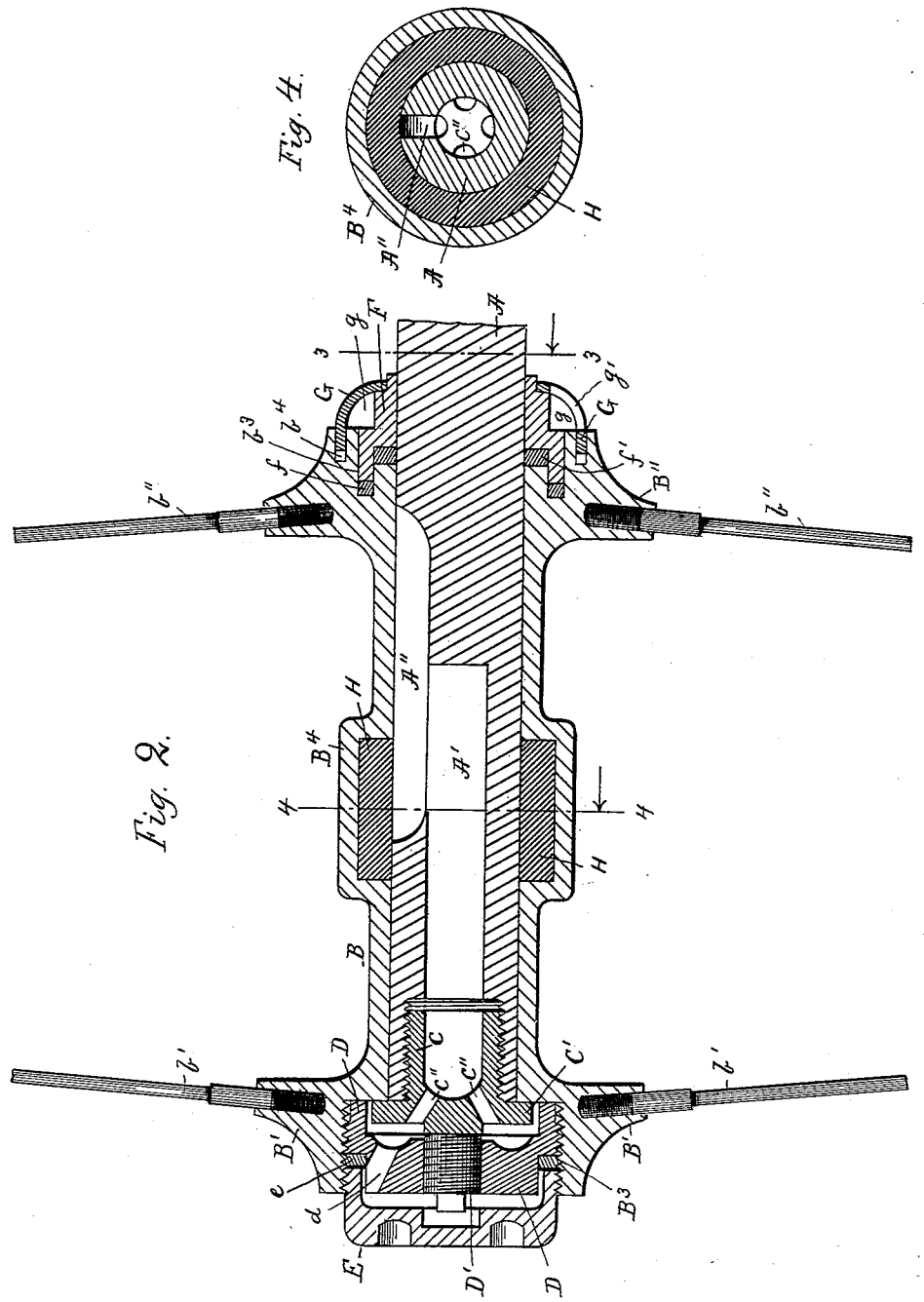
Witnesses:
Karl A. Andrén.
Francis A. Perry
Inventor
Samuel R. Bailey
by Alvan Andrew.
his atty.

UNITED STATES PATENT OFFICE.

SAMUEL R. BAILEY, OF AMESBURY, MASSACHUSETTS.

CARRIAGE-AXLE BEARING.

SPECIFICATION forming part of Letters Patent No. 623,456, dated April 18, 1899.

Application filed December 14, 1898. Serial No. 699,200. (No model.)

*To all whom it may concern:*

Be it known that I, SAMUEL R. BAILEY, a citizen of the United States, residing at Amesbury, in the county of Essex and State of Massachusetts, have invented new and useful Improvements in Self-Oiling Adjustable Axles, of which the following is a specification.

This invention relates to improvements in self-oiling adjustable axles of the type illustrated and described in my former patent, No. 543,368, dated July 23, 1895, and it is carried out as follows, reference being had to the accompanying drawings, wherein—

Figure 3:
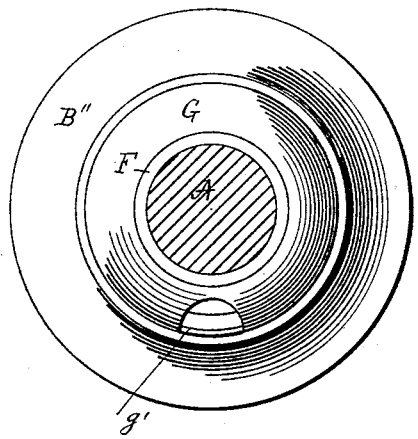
Figure 1:
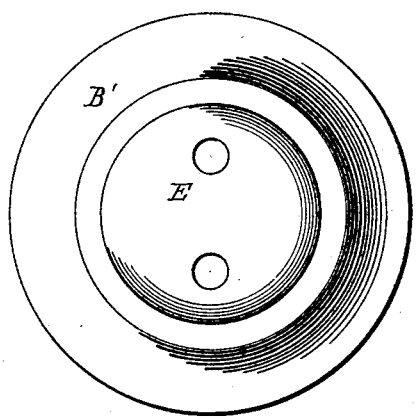
Figure 5:
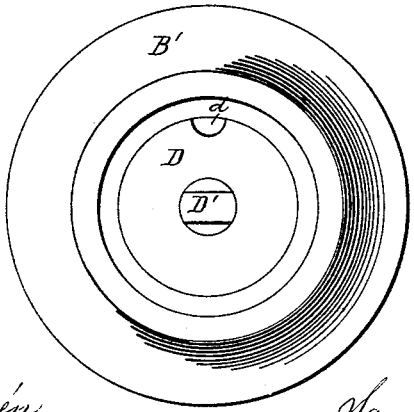

Figure 1 represents an end elevation of the invention. Fig. 2 represents a central longitudinal section of the same. Fig. 3 represents a cross-section on the line 3 3, shown in Fig. 2. Fig. 4 represents a cross-section on the line 4 4, shown in Fig. 2; and Fig. 5 represents an end view showing the dust-cap removed.

Similar letters refer to similar parts wherever they occur on the different parts of the drawings.

In the drawings, A represents the axle, and B represents the box in which said axle is journaled.

B' represents the flange at the outer end of the box, and to such flange are secured the spokes $b'$ $b'$ in any well-known manner. B'' represents a similar flange at the inner end of the box, to which are likewise secured the spokes $b''$ $b''$, as shown.

The outer end of the axle A is internally screw-threaded, and within it is screwed the axle-nut C, provided with a flange C', which is screwed home against the end of the axle A, as shown in Fig. 2. The said flange serves as a bearing or stop against the outer end of the box B, so as to prevent the latter from a longitudinal outward motion relative to said flange C'. The flange B' extends outward as an internally-screw-threaded socket $B^3$, into which is screwed a nut D, the inner annular end of which is screwed up against the outer end of the box B, as shown in Fig. 2. Said nut D is provided with one or more perforations $d$, through which the lubricant is forced into the cavity or axial passage A' of the axle through perforations C'' C'' in the axle-nut C, as shown in Fig. 2.

A'' is a groove on the axle B, communicating with the axial passage A' for the purpose of evenly distributing the lubricant within the axle-bearing.

About midway on the box B is made an annular chamber or pocket $B^4$, containing a felt or other suitable porous packing H, adapted to hold a portion of the lubricant and to distribute it gradually between the axle and its bearing for the proper lubrication of said parts, as shown in Fig. 2. As will be noticed by reference to Fig. 2 of the drawings, the flange C' of the axle-nut serves to prevent the box B from moving outward relative to the axle A. For the purpose of preventing the said box from moving in an opposite direction relative to said axle I make use of an adjustable pivot-screw D', screwed centrally through a screw-threaded perforation in the nut D and having its inner end bearing against the outer surface or end of the axle-nut C, as shown in Fig. 2, by which arrangement the box B is held in its proper place relative to the axle A and prevented from longitudinal movement thereon.

E is a removable dust-cap screwed into the screw-threaded recess $B^3$, and it serves to prevent dust, grit, &c., from reaching the interior of the box B. In practice I prefer to interpose between the inner end of the screw-threaded dust-cap E and the nut D an annular packing-ring $e$, as shown in Fig. 2, so as to make a tight connection at such place.

At the rear end of the flange B'' on the box B is made an annular recess $b^3$, adapted to receive an annular collar F, secured in a suitable manner to the shaft A, as shown in Fig. 2. In practice I prefer to interpose between said collar and the recesses in the flange B'' suitable packing-rings $f$ and $f'$; but this is not essential, as, if so desired, such packings may be dispensed with and spaces may be left between said collar F and the recesses in the end of the flange B'' without departing from the essence of my invention.

To the collar F is secured or made integral with it a shield G, the forward annular portion of which is preferably received in an annular groove $b^4$ in the rear end of the flange B'', as shown in Fig. 2; but this is not essential, as, if so desired, said shield may abut against the rear end of the flange B'' or overlap such rear end without departing from the spirit of my invention. The interior of said shield G forms an annular cavity or pocket $g$, preferably provided on its under side with a delivery-opening $g'$. (Shown in Figs. 2 and 3.)

The cap or shield G serves to prevent water forced by a hose in washing the carriage from entering between the axle and its box, and it also serves to prevent dust, grit, &c., from entering at such place.

In washing the rear end of the bearing any water that may enter the cavity $g$ will freely run out through the exit $g'$, as and for the purpose set forth.

It will be noticed that in this my invention the box B, rotating upon the axle A, is held in its proper adjusted position on such axle, at its outer end only, by the axle-nut C C' and the adjustable screw D and is free upon the said axle in its opposite end, by which the box is caused to rotate upon the axle with a minimum of frictional resistance.

What I wish to secure by Letters Patent and claim is—

1. In a carriage-axle-bearing device, a box B journaled upon the axle A, combined with the axle-nut C secured to the outer end of the axle and having a flange C' held against the box end, a nut D screwed into the end of the box and an adjustable pivot-screw D' screwed axially through said nut and having its inner end resting against the outer end of the axle-nut, substantially as and for the purpose set forth 2. In a carriage-axle-bearing device, in combination, an axle, a box journaled thereon, an axle-nut secured to the axle end and adapted to serve as a bearing against the outer end of the box, a nut D screwed into the outer flanged or socketed end of the box, an adjustable pivot-screw D' screwed through the nut D and adapted to bear against the outer portion of the axle-nut, and a removable dust-cap E, substantially as and for the purpose set forth.

3. In a carriage-axle-bearing device, in combination, an axle having an oil retaining and distributing chamber, a box journaled thereon, an axle-nut secured to the axle end and having perforations communicating with the axle-chamber, a perforated nut D screwed within the socketed end of the box, an adjustable pivot-screw D' screwed through said nut D, and a removable dust-cap E attached to the outer end of the box, substantially as and for the purpose set forth.

4. In an axle-bearing device, the combination with an axle, of a hub journaled thereon and held in position relative to said axle at its outer end, said hub being provided at its inner end with two annular grooves arranged concentric to each other and to the said axle, a ring or collar carried by the axle and provided with an annular flange which freely enters one of said grooves, and a hollow annular cap or shield fixed at one end to said ring or collar and having its opposite edge resting freely within the other one of said annular grooves, substantially as described.

5. In an axle-bearing device, the combination with an axle A, of a hub B, journaled thereon and provided at its inner end B'', with two annular grooves $b^3$, $b^4$, arranged concentric to each other and to the axle-opening, a ring or collar F, carried by the axle and provided with an annular flange which rests freely within the said groove $b^3$ and a hollow annular cap or shield G, fixed at its inner edge to the said ring or collar, and having its outer edge freely seated within the said groove $b^4$, said cap being provided with an exit-opening $g'$, substantially as described.

In testimony whereof I have hereunto set my hand in presence of two subscribing witnesses.

SAMUEL R. BAILEY.

Witnesses:
ALBAN ANDRÉN,
KARL A. ANDRÉN.